United States Patent
Myojo

(10) Patent No.: US 7,376,392 B2
(45) Date of Patent: May 20, 2008

(54) COMMUNICATION DEVICE

(75) Inventor: Toshihiko Myojo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 10/139,668

(22) Filed: May 2, 2002

(65) Prior Publication Data
US 2002/0168970 A1 Nov. 14, 2002

(30) Foreign Application Priority Data
May 8, 2001 (JP) ............................. 2001-137314

(51) Int. Cl.
H04B 7/00 (2006.01)
(52) U.S. Cl. ..................... 455/41.2; 455/41.3; 455/557
(58) Field of Classification Search ................ 455/415, 455/417–420, 426.1, 428, 434, 435.1, 435.2, 455/435.3, 445, 458, 41.2–41.3, 550.1, 552.1, 455/11.1, 556.1, 557, 566
See application file for complete search history.

(56) References Cited

U.S. PATENT DOCUMENTS

| | | | |
|---|---|---|---|
| 4,096,358 A * | 6/1978 | Bidlack et al. | 379/159 |
| 4,703,499 A * | 10/1987 | Fossas et al. | 379/194 |
| 5,572,585 A * | 11/1996 | Tsutsui | 379/242 |
| 5,649,004 A | 7/1997 | Ikeno et al. | 379/212 |
| 6,223,029 B1 * | 4/2001 | Stenman et al. | 455/420 |
| 6,327,477 B1 * | 12/2001 | Hachimura et al. | 455/464 |
| 6,564,056 B1 * | 5/2003 | Fitzgerald | 455/435.1 |
| 6,590,969 B1 * | 7/2003 | Peters et al. | 379/211.02 |
| 6,697,638 B1 * | 2/2004 | Larsson et al. | 455/553.1 |
| 6,763,247 B1 * | 7/2004 | Hollstrom et al. | 455/352 |
| 6,807,256 B1 * | 10/2004 | Holt et al. | 379/88.19 |
| 2001/0012761 A1 * | 8/2001 | Mitama et al. | 455/41 |
| 2001/0027098 A1 * | 10/2001 | Suzuki | 455/415 |
| 2002/0068594 A1 * | 6/2002 | Kolev et al. | 455/517 |
| 2002/0146981 A1 * | 10/2002 | Saint-Hilaire et al. | 455/41 |
| 2003/0096633 A1 * | 5/2003 | Goldberg | 455/556 |

FOREIGN PATENT DOCUMENTS

EP 0999683 5/2000

* cited by examiner

Primary Examiner—Duc M. Nguyen
Assistant Examiner—Anthony S. Addy
(74) Attorney, Agent, or Firm—Morgan & Finnegan, LLP

(57) ABSTRACT

When an incoming call is received from a public network while a portable phone capable of communication via the public network and local communication is in local communication with a first local communication device, a second local communication device is searched and selected to perform local communication with the second local communication device and respond to the incoming call from the public network by using the second communication device.

20 Claims, 9 Drawing Sheets

COMMUNICATION DEVICE

BACKGROUND OF THE INVENTION

1. Field of the Invention

The present invention relates to a communication device for communication via a public network and for local communication.

2. Related Background Art

A digital wireless phone is connected to an external apparatus such as a personal computer (hereinafter abbreviated to PC) via a dedicated digital interface or a universal serial bus (USB). Data of a telephone directory or a scheduling note is exchanged between the digital wireless phone and external apparatus, or mail transfer, Internet access and the like are realized by using the external apparatus. If a digital wireless phone is connected to a head set, speech can be made without holding the phone.

Studies of wireless communication interfaces as substitutes for interface cables are progressing for improving the operability of users. With a wireless communication interface, real time speech communication can be realized by fixedly allocating a communication slot to a communication partner, and digital data divided into packets can be transferred. By using a single wireless communication interface, real time speech communication and various data communication can be realized.

Since a wireless communication interface can realize various data communications, a portable phone is provided with various conventional functions such as remote control of a digital camera and transmission/reception of image data, as well as new functions such as control of an apparatus locally connected to the portable phone via the wireless interface.

While the portable phone (digital wireless phone) controls a locally connected apparatus, an incoming call is received in some cases from a public network.

If an incoming call is received from the public network during local communication, a user can make an off-hook operation. However, there arises the following problem.

If an incoming call is received from the public network and the user makes an off-hook operation during download of telephone directory data from the portable phone to PC and the incoming call requests a connection by the point-to-point protocol (PPP), this connection request from the public network cannot be received because of communication between the portable phone and PC.

SUMMARY OF THE INVENTION

An object of the invention is to respond to an incoming call from a public network at a second local communication device during local communication by a first local communication device.

Another object of the invention is to make it easy for a user to recognize the contents of an incoming call received during local communication and to select a desired operation.

Still another object of the invention is to select an optimum communication device upon reception of an incoming call and omit a wasteful off-hook operation in order to reduce an operation time and communication cost.

A further object of the invention is to receive an incoming call from a public network during an operation of a device by local communication, by switching the current local communication to another device without interception of the communication.

Other objects of the invention will become apparent from the following detailed description of the embodiment.

DETAILED DESCRIPTION OF THE PREFERRED EMBODIMENT

Figure 1:
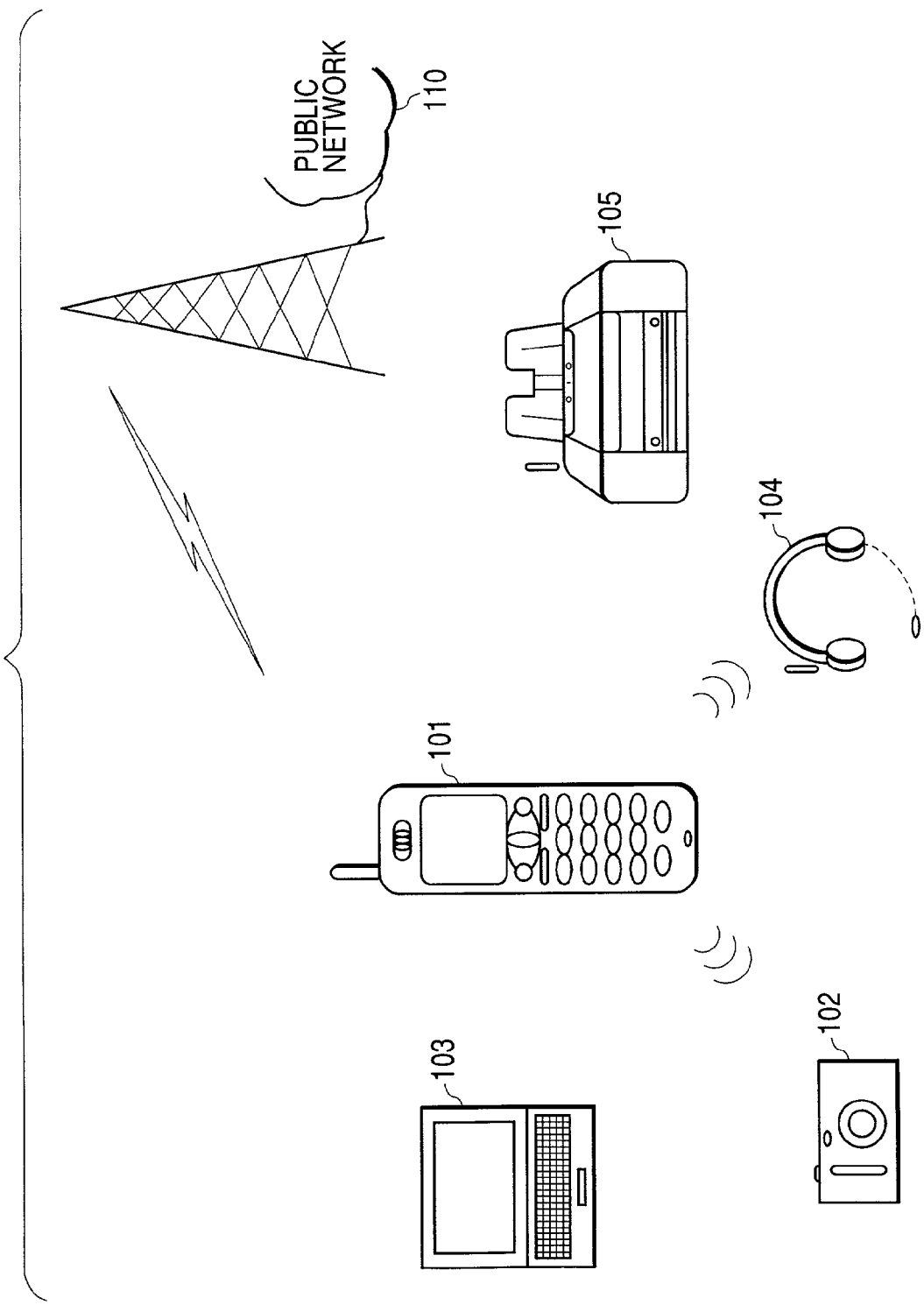
FIG. 1 is a diagram showing the structure of a system embodying the invention.

In FIG. 1 showing the structure of the system, reference numeral 101 represents a portable phone and reference numeral 110 represents a wireless public network.

An imaging device 102 has a local wireless communication interface capable of communication with the portable phone 101. In this embodiment, the imaging device 102 is a digital still camera.

A PC 103 has a local wireless communication interface similar to the camera 102. A head set 104 has a speech communication function for the wireless communication interface. A printer 105 has also a wireless communication interface.

In this embodiment, the invention is applied to the portable phone 101 by way of example. As will be described later, the invention is applicable also to a personal digital assistant (PDA), PC and the like having a communication function via a public wired or wireless network and a local wireless communication function.

Figure 2:
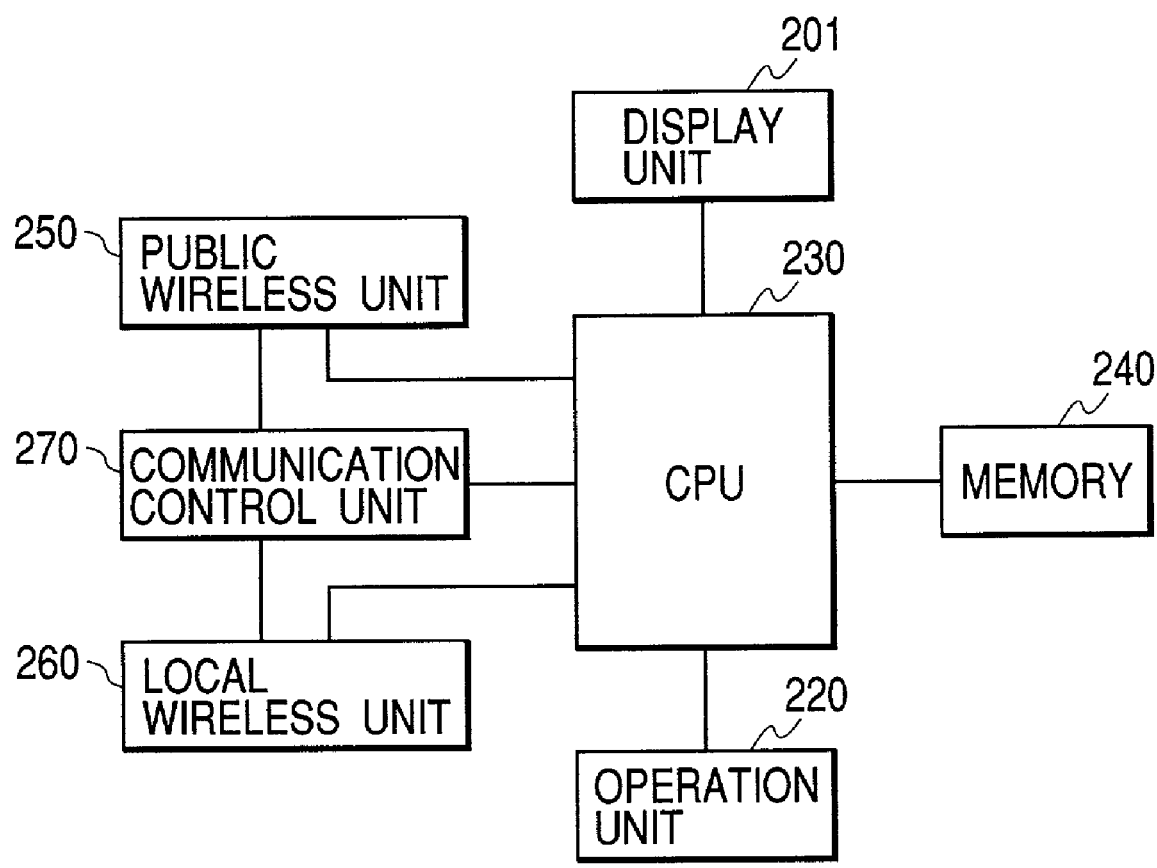
FIG. 2 is a block diagram showing the structure of a portable phone embodying the invention.
Figure 4:
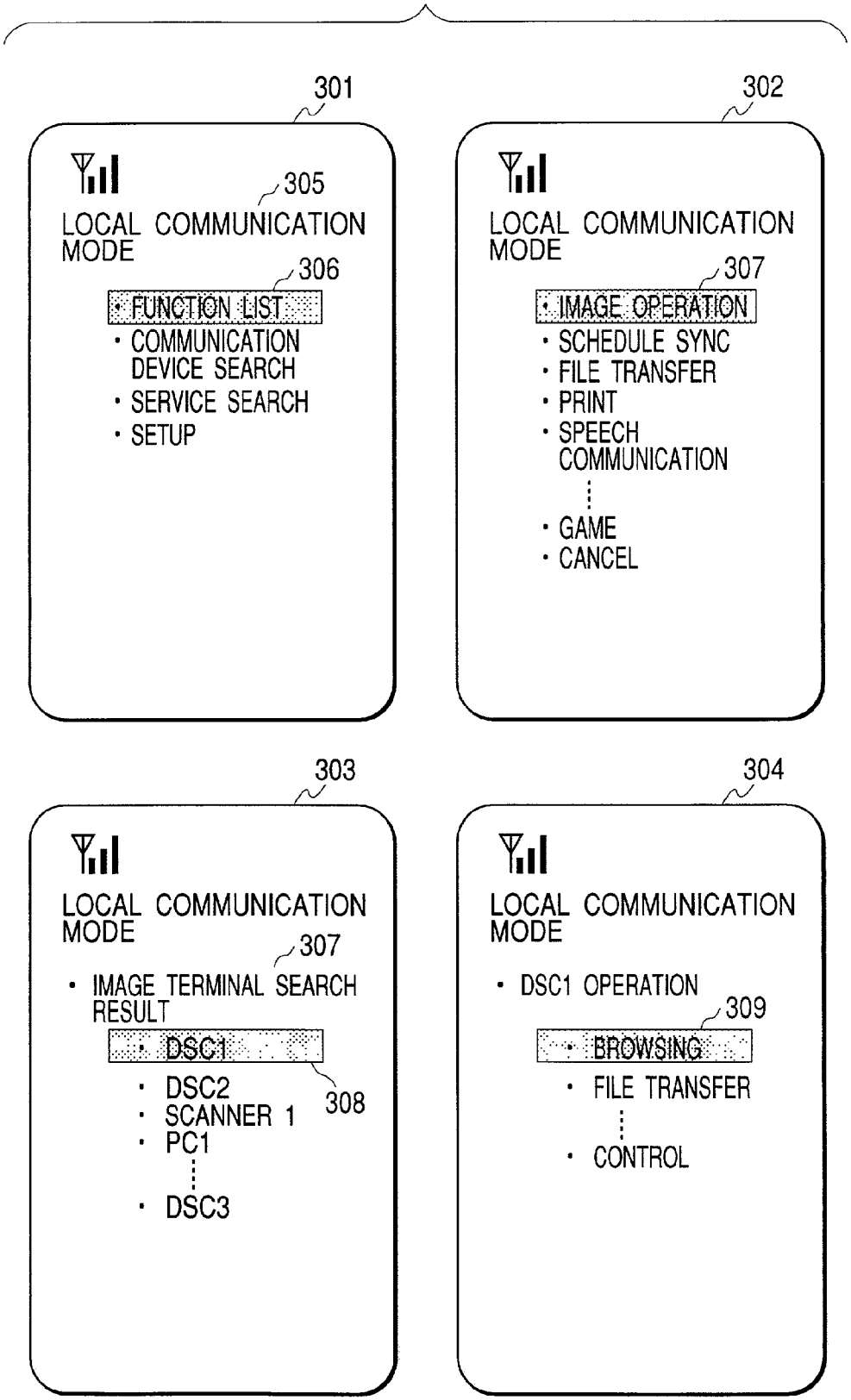
FIG. 4 is a diagram showing local communication mode setting menus of a device embodying the invention.
Figure 5:
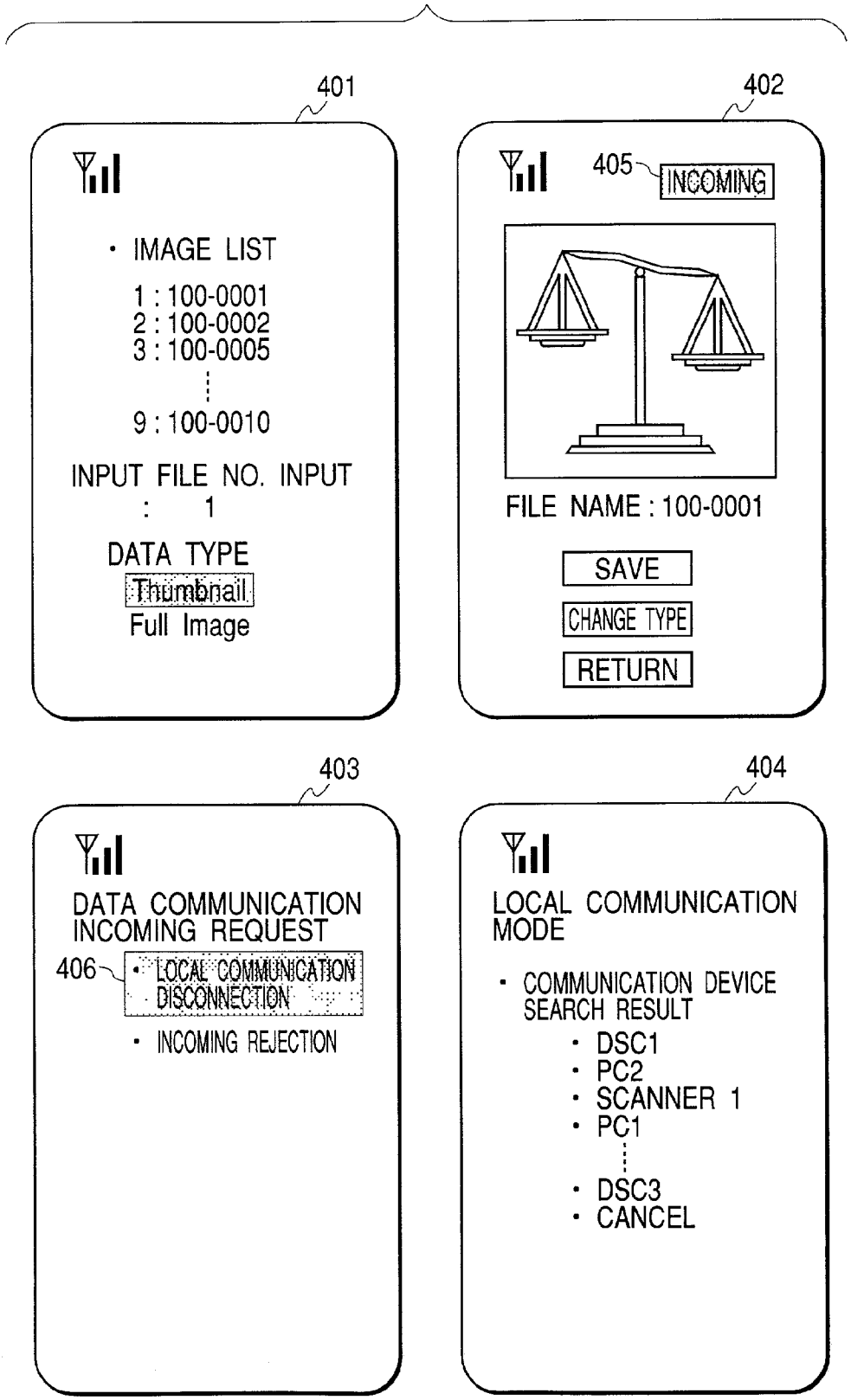
FIGS. 5 and 6 are diagrams showing menus to be displayed during image operation in the local communication mode of the device embodying the invention, and menus to be displayed in response to an incoming call from a public network requesting a similar function to that during image operation.
Figure 6:
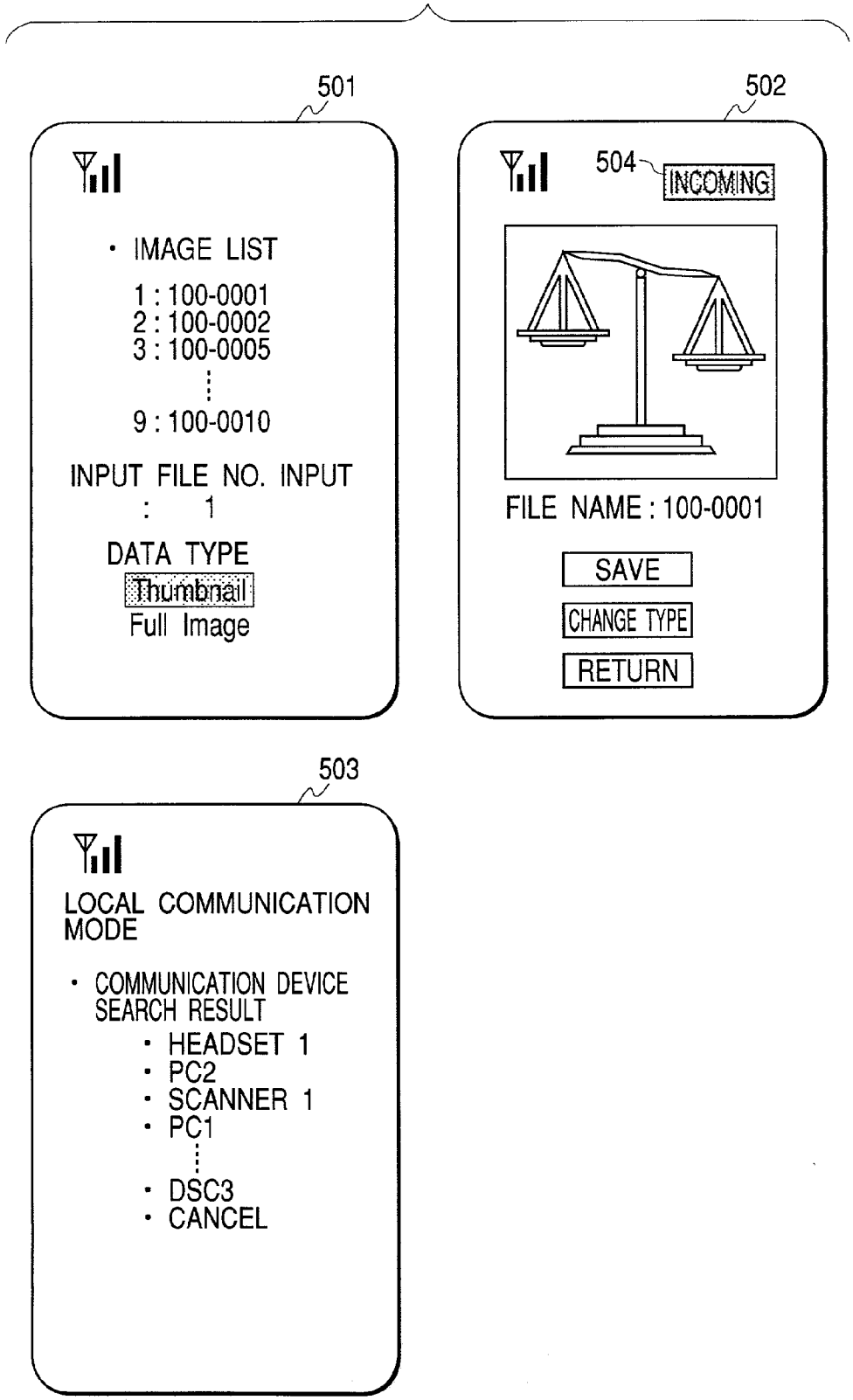

In FIG. 2, a display unit 201 of the portable phone 101 embodying the invention displays various information such as shown in FIGS. 4 to 6.

Figure 3:
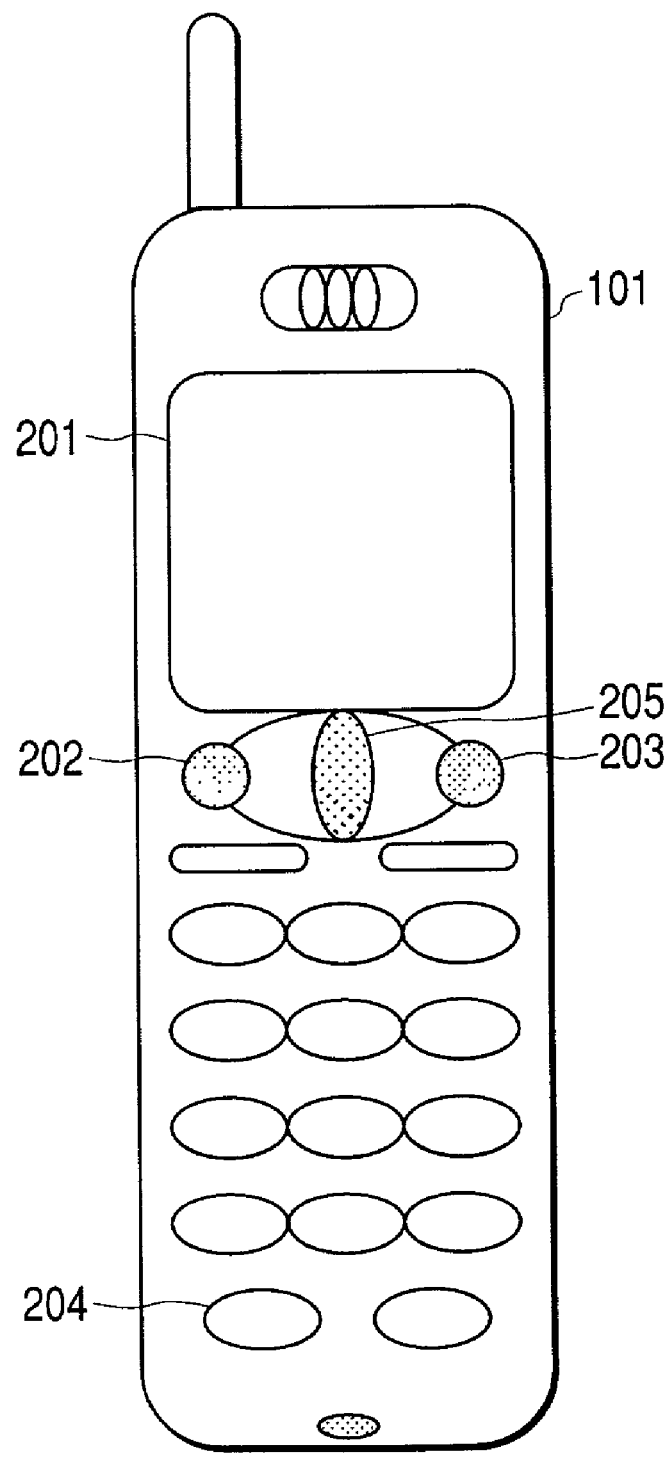
FIG. 3 is a front view of the portable phone embodying the invention.

An operation unit 220 has, as shown in FIG. 3, a speech switch 202, an off switch 203, a local communication mode switch 204, and a cursor motion switch 205.

Figure 7:
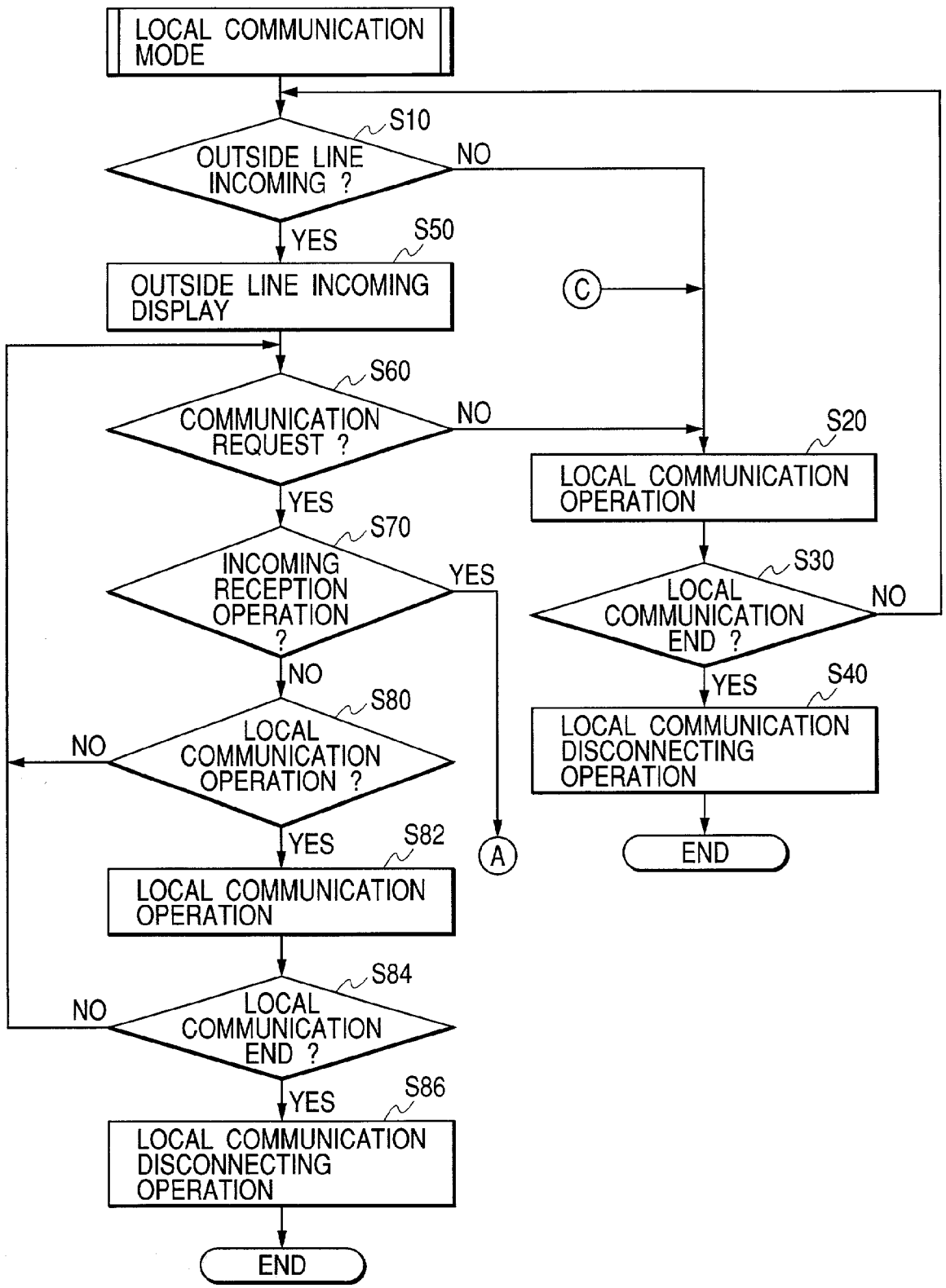
FIGS. 7, 8 and 9 are a flow chart illustrating an operation in a local communication mode of the device.
Figure 8:
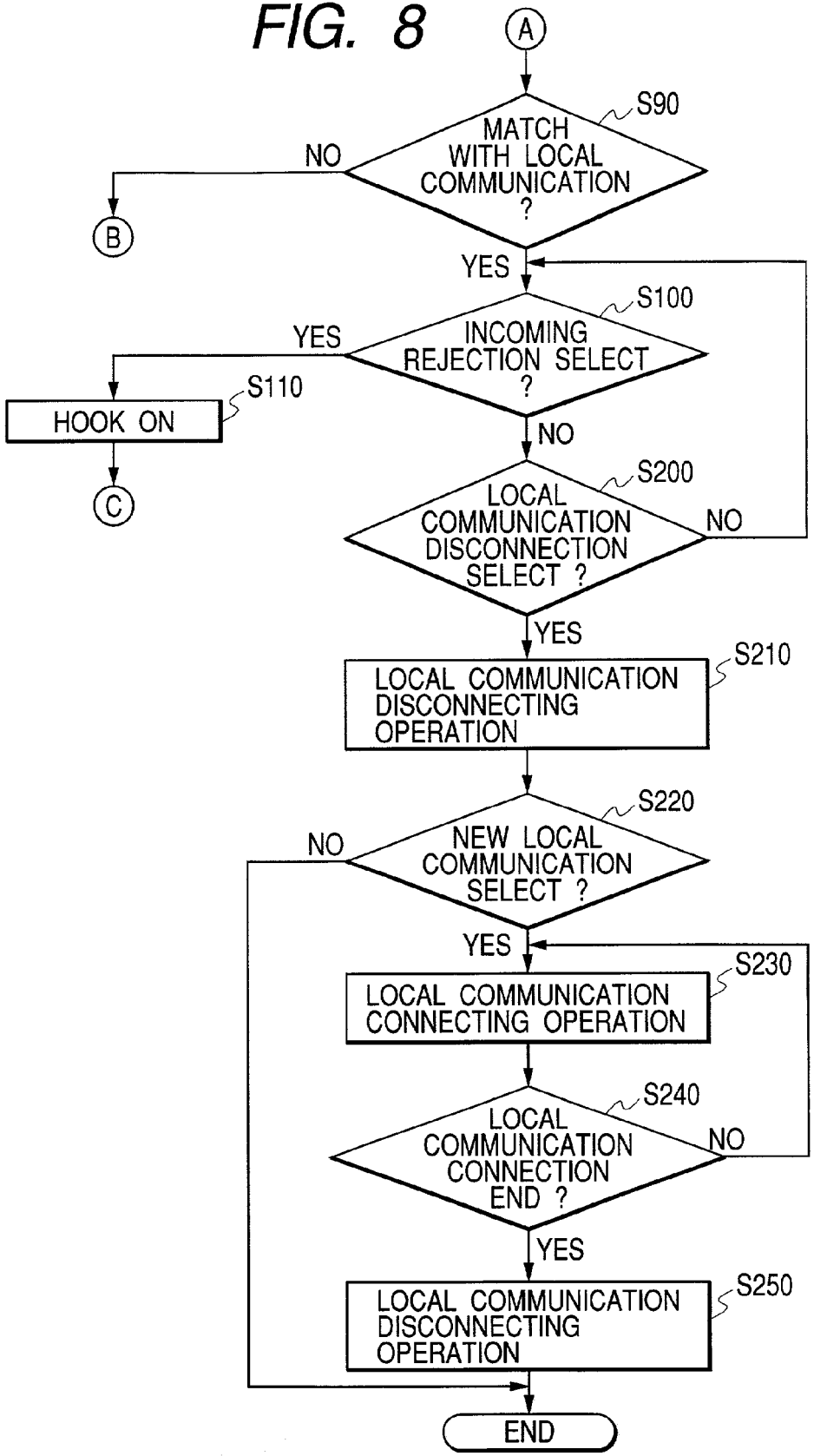
Figure 9:
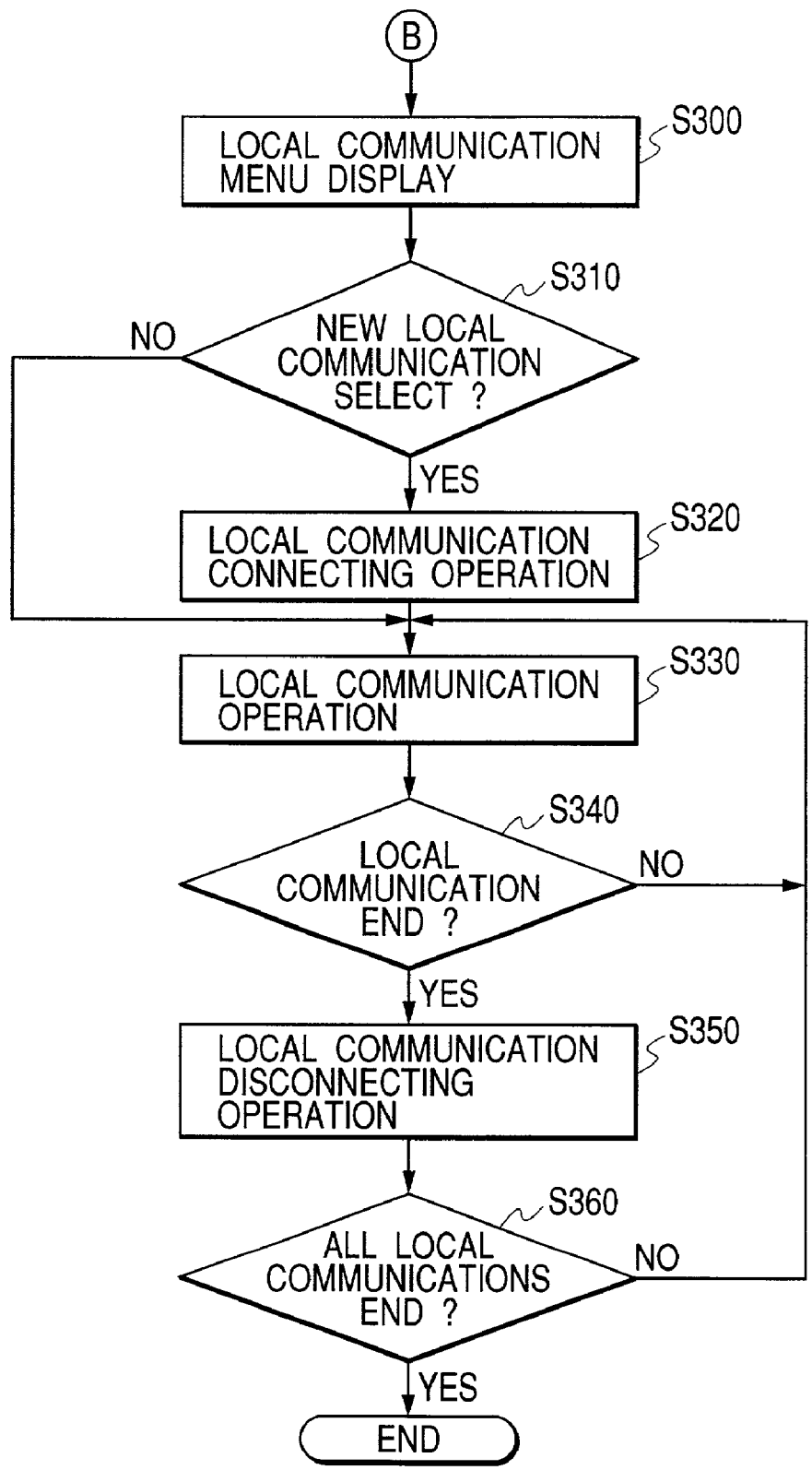

A storage medium or memory 240 stores a program which can be read from a central processing unit (CPU) 230. Some contents of the program are illustrated in the flow chart of FIGS. 7 to 9.

A public wireless unit 250 is used for communication via the wireless public network 110. A local wireless unit 260 has a local wireless interface for local communication without involvement of the public wireless network.

A communication control unit 270 controls to send data received from the public wireless unit 250 to the local wireless unit 260, and to send data received from the local wireless unit 260 to the public wireless unit 250.

In the front view of FIG. 3, the display unit of the portable phone 101 embodying the invention is indicated at 201.

The speech switch 202 of the portable phone 101 is used for connection to the wireless public network 110.

The off switch 203 is used for communication disconnection from the wireless public network 110. When this switch 203 is depressed, the operation similar to an on-hook operation of a telephone is performed.

The local communication mode switch 204 of the portable phone 101 is used for transfer to the local communication mode and for menu selection.

The cursor motion stitch 205 is used for selecting each function of the portable phone.

Referring to FIG. 4, when the local communication mode switch 204 is first depressed, an initial menu 301 of the local communication mode 301 is displayed. When a function list 306 in the initial menu 301 of the local communication mode is selected, a function list menu 302 supported by the local communication mode is displayed.

When an image operation 307 in the function list menu 302 in the local communication mode is selected, a terminal list menu 303 is displayed which displays a list of terminals capable of image operations. This terminal list menu 303 displays the result of image terminal search by the local wireless unit 260. When one terminal 308 is selected from the communicable terminals displayed in the terminal list menu 303, an image operation type select menu 304 is displayed. The image operation types are displayed in the image operation type select menu 304 as the result of local communication between the local wireless unit 260 and a terminal 308 (DSC1).

Referring to FIG. 5, when a browsing function 309 is selected from the image operation type select menu 304, a browsing operation menu 401 is displayed. This browsing operation menu 401 displays an image list received by the local wireless unit 260 from the terminal 308 (DSC1).

A screen 402 shows a particular image browsing case. When an image file number 1 is entered and a thumbnail is selected as the data type in the browsing operation menu 401, on this the screen 402, a thumbnail (reduced image) having a file name 100-0001 corresponding to the image file number 1 in the image list of the menu 401 is displayed. The thumbnail displayed on this screen 402 is received by the local wireless terminal 260 from the terminal 308 (DSC1). If an incoming call is received during the display of the thumbnail having the image fine number 1, an indication 405 representative of the reception of an incoming call is displayed.

During image browsing, when an incoming call is received from the wireless public network 110, which call utilizes the function similar to that selected in the local communication mode (in this case, a data communication incoming request), a local communication mode control select menu 403 is displayed.

When a local communication disconnection 406 is selected from the local communication mode control select menu 403, a select menu 404 is displayed to select a communication device with which new local communication is performed in response to the incoming call. The select menu 404 displays a communication device search result by the local wireless unit 260.

Referring to FIG. 6, similar to the menu 401 shown in FIG. 5, when the browsing function 309 is selected from the image operation type select menu 304, a browsing operation menu 501 is displayed. Similar to the screen 402 shown in FIG. 5, a screen 502 shows a thumbnail having the image file number 1. An indication 504 is representative of the reception of an incoming call during the display of the screen 502.

When an incoming call for speech communication is received from the wireless public network, a local communication mode select menu 503 is displayed. This select menu 503 displays a communication device search result by the local wireless unit 260.

In the case of an incoming call for speech communication, it is not necessary to disconnect local communication. Therefore, the menu corresponding to the control select menu 403 is not displayed, but the local communication mode select menu 503 is displayed.

These menus and screens can be switched by selecting a function or the like with the cursor motion switch 205 or by selecting an image with a ten-key to thereafter establish the selection with the local communication mode switch 204.

In this embodiment, the invention is applied to the portable phone 101 by way of example. As will be described later, the invention is applicable also to a personal digital assistant (PDA), PC and the like having a communication function via a public wired or wireless network and for a local wireless communication function.

Specific operations of the portable phone 101 embodying the invention will be described. Under the control of CPU 230, the following operations are performed by the display unit 201, public wireless unit 250, local wireless unit 260 and communication control unit 270 respectively of the portable phone 101. In accordance with an input from the operation unit 220, outputs from the public wireless unit 250 and local wireless unit 260 and the contents of the memory 240, CPU 230 controls the display unit 201, public wireless unit 250, local wireless unit 260 and communication control unit 270.

If a user desires to operate image files stored in the digital still camera 102 from the portable phone 101, the user first depresses the local communication mode switch 204. In response to this, the initial menu 301 of the local communication mode 305 is displayed on the display unit 201 of the portable phone 101.

The user operates the switch 205 to move the cursor to the function list 306 in the menu 301, and then depresses the local communication mode switch 204. In response to this, the screen is switched to the local communication mode list menu 302 supported by the portable phone 101.

The user operates the switch 205 to move the cursor to the image operation 307 in the menu 302, and then depresses the local communication mode switch 204. In response to this, the local wireless unit 260 of the portable phone 101 performs an operation of searching an imaging device having a local wireless interface within the wireless communication area. The search result is displayed in the terminal list menu 303.

The operation of searching an imaging device utilizes the function of the local wireless interface. Generally, a query signal of the format which the terminal having the local wireless interface can receive is transmitted, and the terminal responded to this query signal is displayed as the search result.

The user operates the switch 205 to move the cursor to a desired imaging device (in this example, the digital still camera 102 having the name DSC1 308 as shown in FIG. 4) in the terminal list menu 303, and then depresses the local communication mode switch 204. In response to this, the local wireless unit 260 acquires an image operation function from the digital still camera and the display unit 201 of the portable phone 101 displays an image operation function list menu 304.

As the user selects browsing 309 as the image operation function by using the switch 205 and local communication mode switch 204, the local wireless unit 260 of the portable phone 101 establishes a wireless communication with the digital still camera 102 to thereby enter the local communication mode.

An example of the image browsing operation will be described.

When the image browsing 309 is selected, the local wireless unit 260 of the portable phone 101 acquires a list of image data files stored in the digital still camera 102 and display them in the menu 401.

The user selects a desired file number (in this example, the file number 1) from the list menu 401 by using the operation unit 220, and the type of data to be acquired is selected. In response to this, the local wireless unit 260 of the portable phone 101 downloads the selected image data from the digital still camera 102 and displays it on the screen 402. In this example, a thumbnail (reduced image) is selected as the data type. In place of the thumbnail, a full image (detailed image) can be selected.

All the above operations are performed by local communication (S20 in FIG. 7) with the digital still camera 102, and continue until the user terminates the image browsing. As the user terminates the local communication (S30), the local wireless unit 260 performs a local communication disconnecting operation (S40).

If an incoming call from the wireless public network 110 is received at the public wireless unit 250 (S10) while the user performs the imaging browsing operation, the portable phone 101 displays the incoming call indication 405 (or 504) on the display unit 201 in accordance with the following flow control of the local communication mode.

After the incoming indication is displayed (S50), CPU 230 of the portable phone 101 confirms the incoming call contents received at the public wireless unit 250 (S60). If the incoming call is a reception notice such as a mail reception notice, the flow branches to S20 to continue the local communication mode. When the public wireless unit 250 receives a mail reception notice, an indication representative of mail reception is displayed on the display unit 201.

If it is judged at S60 that the incoming call is a communication request, the local communication operation with the digital still camera 102 is maintained to be continue until the speech switch 202 is depressed in the state that the incoming indication 405 is displayed (S70, S80). If the operation unit 220 instructs the local communication operation (S80), the local communication operation is performed between the local wireless unit 260 and digital still camera 102 (S82). If the local communication operation is terminated (S84), the local wireless unit 260 disconnects the local communication with the digital still camera 102 (S86). After the local communication operation, a usual incoming call reception operation is performed.

If the speech switch 202 is depressed (if the incoming call reception operation is performed) during the local communication operation (S70), an incoming call contents confirmation operation is performed (S90).

If the type of communication requested by the incoming call received at the public wireless unit 150 matches with the local communication type, i.e., if the incoming call contents received at the public wireless unit 150 request the data communication function such as PPP, CPU 230 of the portable phone 101 displays the local communication mode control select menu 403 to thereby wait for a user instruction, because the protocol (function) necessary for data communication is already prepared by the local communication mode. In this case, an indication of data communication request or packet communication request is displayed in the menu 403 as the type of communication requested by the incoming call.

If an incoming rejection in the menu 403 is selected by the operation unit 220 (S100), the public wireless unit 260 performs an on-hook operation (S110) to return to S20 and prepare for a next incoming call.

If the user selects a local communication disconnection 406 by using the operation unit 220 (S200), the local wireless unit 260 intercepts the local communication operation such as image browsing to disconnect the local communication with the digital still camera 102 (S210).

After the local communication is disconnected at S210, the local wireless unit 260 of the portable phone 101 performs an operation of searching a communication device matching the type of the incoming call received at the public wireless network. All the devices responded to this search are displayed in the menu 404 for allowing a user to select a new local communication mode.

If the incoming call contents correspond to PPP, the user selects the device which supports PPP, e.g., PC1 (103), by using the switch 205 and local communication mode switch 204 (S220).

As PC1 (103) is selected in the local communication mode select menu 404, the local wireless unit 260 acquires the function list supported by PC1 (103) and displays it on the display unit 201, similar to the previously described function list menu 304 of the digital still camera.

If the data communication function is selected from the menu, the local wireless unit 260 performs a local communication connection operation with PC1 (103) (S230), the public wireless unit 150 responds to the incoming call, and the communication control unit 270 connects the local wireless unit 260 and public wireless unit 250 to thereby establish a connection between PC1 and a calling party of the incoming call received at the public wireless network 110.

In order to terminate the local communication thereafter (S240), the local wireless unit 260 disconnects the local communication with PC1 (103) (S250). The public wireless unit 250 disconnects the public communication operation.

If the user selects the local communication disconnection 406 at S210 and thereafter cancels it by using the local communication mode select menu 404 (No at S220), a connection is established between the public wireless unit 250 of the portable phone 101 and the calling party via the public wireless network 110 if the portable phone 101 supports the communication function including PPP, or the connection is aborted by the timeout of a timer stipulated by PPP.

Next, the description will be given for the case of an incoming call of speech communication during the image browsing in the local communication mode.

Similar to the above-described operations, when there is an incoming call from the public wireless network 110 at S10 while the user browses the image data of the digital still camera 102 by using the portable phone 101 at S20 in the local communication mode, the portable phone 101 displays an incoming indication 504 in the menu 502 at S50 and waits for an operation of the speech switch 202 by the user.

As the user depresses the speech switch 202 at S70, CPU 230 of the portable phone 101 confirms the incoming call contents. If it is judged that the incoming call contents are speech communication (this judgement is made basing upon whether or not the communication mode with the public wireless network is a packet communication mode), the function used by the local communication mode does not match. Therefore, the local wireless unit 260 of the portable phone 101 performs the communication device search operation and displays the search result in the new local communication mode select menu 503 (S300) while the local communication with the digital still camera 102 is maintained to be continued.

In addition to this display, an indication of speech communication request may be displayed.

If this communication device search detects the head set 104 capable of speech communication within the communication area and the user desires to utilize this head set, the head set 104 is selected from the local communication mode select menu 503 by using the operation unit 20 (S310).

In response to this selection, the local wireless unit 260 of the portable phone 101 establishes the local communication connection to the head set 104, while the local communication between the digital still camera 102 is maintained to be continued (S320). The public wireless unit 250 responds to the incoming call, and the communication control unit 270 connects the local wireless unit 260 and public wireless unit 250 to thereby establish a connection between the head set 104 and the calling party of the incoming call received at the public wireless network 110.

After the local communication operation is performed (S330), speech communication is terminated and the user depresses the off switch 203 of the portable phone 101 (S340). In response to this, the public wireless unit 250 of the portable phone 101 disconnects the communication with the public wireless network 110, and thereafter the local wireless unit 260 disconnects the local communication with the head set 104 (S350). If the local communication disconnected at S340 is the local communication newly established at S320, then the flow returns to S330 whereat image browsing continues (S360). In this case, the flow may return to S20 to prepare for the next incoming call.

If the local communication disconnected at S340 is image browsing, then the local wireless unit 260 disconnects the local communication with the digital still camera 102 (S350). In this case, the communication with the public wireless network 110 is not disconnected, and the flow returns to S330 to continue the speech communication using the head set 104.

After both the image browsing of the digital still camera 102 and the speech communication by the head set 104 are terminated, it is judged at S360 that all local communications were terminated, and the local communication mode is terminated.

In the above description, in response to a PPP requesting incoming call from the public wireless network 110 during the local communication with the digital still camera 102, the local communication with the digital still camera 102 is terminated. If the local wireless unit 260 supports a multi logic link, both the digital still camera and PC can be connected.

The operation will be described wherein the local wireless communication interface supports the multi logic link.

Similar to the above description, in response to an incoming call from the public wireless network 110 at S10 during image browsing by the portable phone 101 at S20, the incoming indication is displayed at S50 and thereafter the communication request judgement at S60 and incoming reception judgement/standby at S70 are performed. Then, as the user operates the speech switch 202 at S70 and the incoming call is accepted, the portable phone 101 performs the communication device search at S300 and displays the search result of communication devices excepting the device now in the local communication in the new local communication mode select menu.

After the menu is displayed, the user selects a new local communication device by using the switch 205 and local communication mode switch 204 at S310. In response to this, the portable phone 101 displays the list of functions supported by the selected communication device, and establishes the local communication connection to the device with the selected function.

The invention has been described in connection with the preferred embodiment. The invention is not limited only to a portable phone, but is also applicable to personal digital assistant (PDA), PC and the like. Various modifications are possible without departing from the scope of the claims.

What is claimed is:

1. A communication device capable of communicating with a public network communication device and a first local communication device, comprising:

first receiving means for receiving an incoming call from the public network communication device;

determining means for determining whether the incoming call received by said receiving means is for a data communication or a voice communication while the communication device is performing a data communication with the first local communication device;

searching means for searching at least a second local communication device capable of performing the data communication with the incoming call, if it is determined that the incoming call is for the data communication by the determining means, and searching at least a third local communication device capable of performing the voice communication with the incoming call, if it is determined that the incoming call is for the voice communication by the determining means;

displaying means for displaying at least one of the second and third local communication devices depending on result from the searching means;

second receiving means for receiving a command from a user who selects at least one of the second and third local communication devices based on information displayed on the displaying means; and communication means for establishing a communication between at least one of the second and third local communication devices and the incoming call based on the command from the user received at the receiving means, wherein the communication device is further configured to disconnect data communication with the first local communication device before the searching operation by the searching means if it is determined that the incoming call received while the communication device is performing the data communication with the first local communication device is for the data communication, and maintains the data communication if it is determined that the incoming call received while the communication device is performing the data communication with the first local communication device is for the voice communication.

2. A communication device according to claim 1, wherein said communication means includes selecting means for selecting whether or not the local communication with the first local communication device is disconnected, in accordance with a type of the incoming call when the incoming call is received from the public network during the local communication with the first local communication device.

3. A communication device according to claim 1, further comprising selecting means for selecting whether or not the local communication with the second local communication device is disconnected, in accordance with a type of the incoming call when the incoming call is received from the public network during the local communication with the first local communication device.

4. A communication device according to claim 1, wherein said searching means searches a local communication device in accordance with a type of the incoming call from the public network.

5. A communication method of a communication device for communicating with a public network communication device and a local communication device, the method comprising the steps of:
- receiving an incoming call from the public network communication device;
- determining whether the incoming call received at the incoming call receiving step is for a data communication or a voice communication while the communication device is performing a data communication with a first local communication device;
- disconnecting the data communication with the first local communication device if it is determined that the incoming call is for the data communication while the communication device is performing the data communication with the first local communication device, and maintaining the data communication with the first local device if it is determined that the incoming call is for the voice communication;
- searching at least a second local communication device capable of performing the data communication with the incoming call, if it is determined that the incoming call is for the data communication by the determining step, and searching at least a third local communication device capable of performing the voice communication with the incoming call, if it is determined that the incoming call is for the voice communication by the determining step;
- displaying at least one of the second and third local communication devices depending on result from the searching step;
- receiving a command from a user who selects at least one of the second and third local communication devices based on information displayed by the displaying step; and
- connecting a communication between at least one of the second and third local communication devices and the incoming call based on the command from the user received at the command receiving step.

6. A communication method according to claim 5, wherein the local communication step includes a step of selecting whether or not the local communication with the first local communication device is disconnected, in accordance with a type of the incoming call when the incoming call is received from the public network during the local communication with the first local communication device.

7. A communication method according to claim 5, further comprising a step of selecting whether or not the local communication with the second local communication device is disconnected, in accordance with a type of the incoming call when the incoming call is received from the public network during the local communication with the first local communication device.

8. A communication method according to claim 5, wherein the second local communication device is searched in accordance with a type of the incoming call from the public network.

9. A program for a communication by a communication device embodied in a computer readable media for communicating with a public network communication device and a local communication device, the communication program comprising the steps of:
- receiving an incoming call from the public network communication device;
- determining whether the incoming call received at the incoming call receiving step is for a data communication or a voice communication while the communication device is performing a data communication with a first local communication device;
- disconnecting the data communication with the first local communication device if it is determined that the incoming call is for the data communication while the communication device is performing the data communication with the first local communication device, and maintaining the data communication with the first local device if it is determined that the incoming call is for the voice communication;
- searching at least a second local communication device capable of performing the data communication with the incoming call, if it is determined that the incoming call is for the data communication by the determining step, and searching at least a third local communication device capable of performing the voice communication with the incoming call, if it is determined that the incoming call is for the voice communication by the determining step;
- displaying at least one of the second and third local communication devices depending on result from the searching step;
- receiving a command from a user who selects at least one of the second and third local communication devices based on information displayed at the displaying step; and
- connecting a communication between at least one of the second and third local communication devices and the incoming call based on the command from the user received at the command receiving step.

10. The program according to claim 9, wherein the local communication step includes a step of selecting whether or not the local communication with the first local communication device is disconnected, in accordance with a type of the incoming call when the incoming call is received from the public network during the local communication with the first local communication device.

11. The program according to claim 9, further comprising a step of selecting whether or not the local communication with the second local communication device is disconnected, in accordance with a type of the incoming call when the incoming call is received from the public network during the local communication with the first local communication device.

12. The program according to claim 9, wherein the second local communication device is searched in accordance with a type of the incoming call from the public network.

13. A communication apparatus comprising:
- local communication means for performing a local communication with a first local device in a local network;
- public communication means for performing a public communication with a public network communication device in a public network;
- control means for controlling the communication between the local communication means and the public communication means;
- receiving means for receiving an incoming call from the public network communication device; and determining means for determining whether the incoming call from the public network communication device is for a data communication or a voice communication while the communication apparatus is performing a data communication with the first local device, wherein said local communication means disconnects local communication with the first local device and performs a local device search for at least a second local communication device capable of performing the data communication with the incoming call, if it is determined that the incoming call received while the communication apparatus is performing the data communication with the first local device is for the data communication by the determining means, and maintains the local communication with the first local device and performs a local device search for at least a third local communication device capable of performing the voice communication with the incoming call, if it is determined that the incoming call received while the communication apparatus is performing the data communication with the first local device is for the voice communication by the determining means, and wherein said control means displays at least one of the second and third local communication devices depending on result from the local device search and receives a command from a user who selects at least one of the second and third local communication devices based on displayed information thereby establishing a communication between at least one of the second and third local communication devices and the incoming call based on the command from the user.

14. A communication apparatus according to claim 13, wherein said local communication means performs the local device search in accordance with a type of the communication request.

15. A communication method comprising the steps of:
performing local communication with a first local device in a local network;
performing a public communication with a public network communication device in a public network;
controlling the communication between the local communication means and the public communication means; and
receiving an incoming call request from the public network communication device;
determining whether the incoming call from the public network communication device is for a data communication or a voice communication while the communication apparatus is performing a data communication with the first local device;
disconnecting local communication with the first local device and performing a local device search for at least a second local communication device capable of performing the data communication with the incoming call, if it is determined that the incoming call is for the data communication by the determining step;
maintaining the local communication with the first local device and performing a local device search for at least a third local communication device capable of performing the voice communication with the incoming call, if it is determined that the incoming call is for the voice communication by the determining step; and
displaying at least one of the second and third local communication devices depending on result from the local device search and receiving a command from a user who selects at least one of the second and third local communication devices based on displayed information thereby establishing a communication between at least one of the second and third local communication devices and the incoming call based on the command from the user.

16. A communication method according to claim 15, wherein said controlling step comprises a step of selecting whether or not the local communication with the first local communication device is disconnected, in accordance with a type of the communication request received during the local communication with the first local communication device.

17. A communication method according to claim 15, wherein said local device search is performed in accordance with a type of the communication request.

18. A program for a communication by a communication device embodied in a computer readable media for communicating with a public network communication device and a local communication device comprising the steps of:
performing a local communication with a first local device in a local network;
performing a public communication with a public network communication device in a public network;
controlling the communication between the local communication means and the public communication means;
receiving an incoming call request from the public network communication device;
determining whether the incoming call from the public network communication device is for a data communication or a voice communication while the communication apparatus is performing a data communication with the first local device;
disconnecting the local communication with the first local device and performing a local device search for at least a second local communication device capable of performing the data communication with the incoming call, if it is determined that the incoming call is for the data communication by the determining step;
maintaining the local communication with the first local device and performing a local device search for at least a third local communication device capable of performing the voice communication with the incoming call, if it is determined that the incoming call is for the voice communication by the determining step; and
displaying at least one of the second and third local communication devices depending on the result from the local device search and receiving a command from a user who selects at least one of the second and third local communication devices based on displayed information, thereby establishing a communication between at least one of the second and third local communication devices and the incoming call based on the command from the user.

19. The program embodied in a computer readable media according to claim 18, wherein said receiving step comprises a step of selecting whether or not the local communication with the first local communication device is disconnected, in accordance with a type of the communication request received during the local communication with the first local communication device.

20. The program embodied in a computer readable media according to claim 18, wherein said local device search is performed in accordance with a type of the communication request.

* * * * *